(12) United States Patent
Feng (10) Patent No.: US 11,921,545 B2
(45) Date of Patent: Mar. 5, 2024

(54) DISPLAY DEVICE

(71) Applicant: WUHAN CHINA STAR OPTOELECTRONICS SEMICONDUCTOR DISPLAY TECHNOLOGY CO., LTD., Wuhan (CN)

(72) Inventor: Zikang Feng, Wuhan (CN)

(73) Assignee: WUHAN CHINA STAR OPTOELECTRONICS SEMICONDUCTOR DISPLAY TECHNOLOGY CO., LTD., Wuhan (CN)

(*) Notice: Subject to any disclaimer, the term of this patent is extended or adjusted under 35 U.S.C. 154(b) by 897 days.

(21) Appl. No.: 16/963,509

(22) PCT Filed: Jun. 24, 2020

(86) PCT No.: PCT/CN2020/098117
§ 371 (c)(1),
(2) Date: Jul. 21, 2020

(87) PCT Pub. No.: WO2021/237853
PCT Pub. Date: Dec. 2, 2021

(65) Prior Publication Data
US 2023/0156105 A1 May 18, 2023

(30) Foreign Application Priority Data
May 26, 2020 (CN) .......................... 202010455196.9

(51) Int. Cl.
*G06F 1/16* (2006.01)

(52) U.S. Cl.
CPC .................................. *G06F 1/1652* (2013.01)

(58) Field of Classification Search
CPC .. G06F 1/1652; H04M 1/0268; H04M 1/0237
See application file for complete search history.

(56) References Cited

U.S. PATENT DOCUMENTS 10,082,833 B2 * 9/2018 Chen .................... G06F 1/1652
10,152,086 B2 * 12/2018 Choi ...................... G09F 9/301
(Continued)

FOREIGN PATENT DOCUMENTS

| CN | 105518769 A | 4/2016 |
|---|---|---|
| CN | 106875846 A | 6/2017 |

(Continued)

OTHER PUBLICATIONS

International Search Report in International application No. PCT/CN2020/098117, dated Mar. 1, 2021.
(Continued)

*Primary Examiner* — Adrian S Wilson
(74) *Attorney, Agent, or Firm* — PV IP PC; Wei Te Chung; Zhigang Ma (57) ABSTRACT

A display device is provided and includes: a case assembly, a first supporting component, a second supporting component disposed to be slidable relative to the first supporting component, and a transmission mechanism connected to the second supporting component; and a flexible display screen laying on one side of the first supporting component and one side of the second supporting component, a first end of the flexible display screen connected to one end of the second supporting component far away from the first supporting component, and a second end of the flexible display screen connected to the transmission mechanism.

17 Claims, 4 Drawing Sheets

(56) References Cited

U.S. PATENT DOCUMENTS

| | | | |
|---|---|---|---|
| 10,430,923 B2 * | 10/2019 | Lu | H05K 1/028 |
| 10,488,959 B2 * | 11/2019 | Aurongzeb | G06F 1/1679 |
| 10,817,022 B2 * | 10/2020 | Cho | G06F 3/0487 |
| 10,881,009 B2 * | 12/2020 | Jiang | H05K 5/0017 |
| 11,112,826 B2 * | 9/2021 | Ko | G06F 3/04817 |
| 11,632,452 B2 * | 4/2023 | Delaporte | G06F 1/1652 |
| | | | 345/13 |
| 11,662,771 B2 * | 5/2023 | Kim | G06F 1/1624 |
| | | | 361/679.01 |
| 2012/0314400 A1 | 12/2012 | Bohn et al. | |
| 2018/0081473 A1 * | 3/2018 | Seo | G06F 1/3287 |
| 2018/0181164 A1 * | 6/2018 | Chen | G06F 1/1624 |
| 2019/0146558 A1 * | 5/2019 | Ohata | G09G 5/00 |
| | | | 361/679.21 |
| 2020/0152095 A1 * | 5/2020 | Lee | G09F 9/301 |
| 2020/0264660 A1 * | 8/2020 | Song | H04M 1/0237 |
| 2021/0328160 A1 * | 10/2021 | Feng | H10K 50/84 |
| 2021/0383727 A1 * | 12/2021 | Han | G06F 1/1624 |

FOREIGN PATENT DOCUMENTS

| | | |
|---|---|---|
| CN | 110491289 A | 11/2019 |
| CN | 110782783 A | 2/2020 |

OTHER PUBLICATIONS

Written Opinion of the International Search Authority in International application No. PCT/CN2020/098117, dated Mar. 1, 2021.

* cited by examiner

DISPLAY DEVICE

TECHNICAL FIELD

The present disclosure relates to a display technology field, and more particularly to a display device.

BACKGROUND

With the development of technology, appearances of mobile electronic devices have been changed greatly. Flexible screens are highly concerned due to their unique characteristics and great potential. Compared to the traditional screens, the flexible screens have characteristics of strong flexibility and being bendable and can decrease degrees of destroying devices accidentally. Durability of the flexible screens is greater than durability of other screens.

Conventional flexible screens include foldable screens and bendable screens. Although sizes of panels of the two types of display screens are decreased to a certain extent, the two types of display screens still occupy great space.

Consequently, there is an urgent need for a flexible display device to solve the above-mentioned technical problem.

SUMMARY OF DISCLOSURE

The present disclosure provides a display device to solve the problem that sizes of conventional flexible screens are great.

The present disclosure provides a display device including:
  a case assembly, a first supporting component disposed to be fixed to the case assembly, a second supporting component disposed to be slidable relative to the first supporting component, and a transmission mechanism disposed in the case assembly and connected to the second supporting component; and
  a flexible display screen laying on one side of the first supporting component and one side of the second supporting component, a first end of the flexible display screen connected to one end of the second supporting component far away from the first supporting component, and a second end of the flexible display screen connected to the transmission mechanism;
  wherein when the first supporting component slides relative to the second supporting component, the two ends of the flexible display screen move, due to effect of the transmission mechanism, with the same distance in the same time.

In the display device of the present disclosure, the case assembly includes a first case body and a second case body which are disposed opposite to each other, the first case body is fixed to and connected to the first supporting component, and the second case body is fixed to and connected to the second supporting component;
  the flexible display screen includes a first part disposed on a surface of the case assembly and a second part disposed in the case assembly;
  the transmission mechanism includes at least gear set and at least one screw which are positioned on the first case body and a rack set which is positioned on the second case body, the gear set engages with the rack set, and the screw and the gear set rotate coaxially;
  when the display device implements a small-screen display, the first part of the flexible display screen is in a display state and the second part of the flexible display screen is in a non-display state; and
  when the display device implements a large-screen display, the rack set on the second case body drives, via the gear set, the screw to rotate, so that the second case body moves in a direction far away from the first case body, the second part of the flexible display screen moves from inside of the case assembly to the surface of the case assembly, and the first part and the second part of the flexible display screen are in the display state.

In the display device of the present disclosure, the rack set includes at least one first rack, and the first rack is disposed close to a first side surface or/and a second side surface of the second case body; and
  when the display device implements the large-screen display, the first rack drives, via the gear set, the screw to rotate, so that the second case body moves in the direction far away from the first case body.

In the display device of the present disclosure, the gear set at least includes:
  at least one first gear, the first gear engaging with the first rack, and the first gear positioned at one side of the first rack far away from the flexible display screen;
  at least one second gear, and the first gear and the second gear rotating coaxially;
  at least one first roller, and the first roller penetrating the first gear and the second gear and fixed to and connected to the first gear and the second gear; and
  at least one third gear, the third gear engaging with the second gear, and the third gear and the screw rotating coaxially;
  when the display device implements the large-screen display, the first rack transmits, via the first gear, the second gear, the third gear, and the first roller, a driving force to the screw, so that the second case body moves via the screw in the direction far away from the first case body.

In the display device of the present disclosure, the gear set further includes:
  at least two first bearing sets, each of the first bearing sets including two first bearings, the first bearings positioned at two sides of the first roller, the first bearings fixed to and connected to the first roller, and the first gear, the second gear, and the first roller rotating in the first bearings; and
  at least two gear stands, each of the gear stands corresponding to one of the first bearing sets, the gear stands fixed to and connected to a first side case or/and a second side case of the first case body, and the first case body and the second case body make the gear stands have a first opening toward a front case of the second case body.

In the display device of the present disclosure, the first gear is a spur gear, and the second gear and the third gear are bevel gears; and
  wherein when a pitch diameter of the first gear is A, a pitch diameter of the second gear is B, a pitch diameter of the third gear is C, and a screw pitch of the screw is L, a relationship of the first gear, the second gear, the third gear, and the screw is $B*L=\pi*A*C$.

In the display device of the present disclosure, the display device further includes:
  a sliding block, and the sliding block slidably connected to the screw; and
  a second roller positioned at one side of the first case body far away from the gear set, and the second part of the flexible display screen extending to inside of the first case body along the second roller and fixed to and connected to the sliding block;

wherein when the display device implements the large-screen display, the external driving force drives the second case body to move in the direction far away from the first case body and the screw drives the sliding block to move in a direction far away from the first gear, so that the second part of the flexible display screen moves from the inside of the first case body to a surface of the first case body; and when the display device implements the small-screen display, the external driving force drives the second case body to move in a direction close to the first case body, the screw drives the sliding block to move in a direction close to the first gear, and the flexible display screen rolls along the second roller, so that the second part of the flexible display screen moves from the surface of the first case body to the inside of the first case body and extends toward a direction of the first roller.

In the display device of the present disclosure, the flexible display screen includes a display panel, a tensile layer, and an adhesive layer positioned between the display panel and the tensile layer, a first terminal of the tensile layer is fixed to and connected to the second case body, and a second terminal of the tensile layer is fixed to and connected to the sliding block.

In the display device of the present disclosure, an area of the display panel is smaller than an area of the tensile layer.

In the display device of the present disclosure, the flexible display screen further includes a third part fixed to and connected to the sliding block, the third part of the flexible display screen corresponds to the tensile layer, and the third part of the flexible display screen is a non-functional area of the display device.

In the display device of the present disclosure, a material of the tensile layer is a tensible material including a sus metallic material or an amorphous material.

In the display device of the present disclosure, the adhesive layer is a viscous layer including an optical adhesive.

In the display device of the present disclosure, the first case body includes a rear case and a first side case and a second side case which are positioned at two sides of the rear case, the second case body includes a front case, the first supporting component is fixed to and connected to the rear case, the first side case, and the second side case, and the second supporting component is fixed to and connected to the front case;

the first supporting component includes a first supporting plate, and the first supporting plate includes a plurality of first supporting bars and a plurality of first insertion holes each positioned between two adjacent ones of the first supporting bars;

the second supporting component includes a second supporting plate, and the second supporting plate includes a plurality of second supporting bars and a plurality of second insertion holes each positioned between two adjacent ones of the second supporting bars;

when the display device implements the small-screen display, the first insertion holes are configured to contain the second supporting bars and the second insertion holes are configured to contain the first supporting bars, so that the first supporting plate cooperates with the second supporting plate to support the first part of the flexible display screen; and when the display device implements the large-screen display, the second supporting component moves in the direction far away from the first case body, the second part of the flexible display screen moves from inside of the first case body to a surface of the first case body, the second supporting plate is separated from the first supporting plate, the second supporting component is configured to support the first part of the flexible display screen, and the first supporting component is configured to support the second part of the flexible display screen.

In the display device of the present disclosure, the first supporting component further includes a first bottom plate positioned at one side of the first supporting plate far away from the flexible display screen, and the second supporting component further includes a second bottom plate positioned at one side of the second supporting plate far away from the flexible display screen; and a first gap is formed between the first bottom plate and the first supporting plate, and the first gap is configured to contain the second bottom plate; or a second gap is formed between the second bottom plate and the second supporting plate, and the second gap is configured to contain the first bottom plate.

In the display device of the present disclosure, the display device further includes an elevating mechanism configured to adjust the first bottom plate or/and the second bottom plate;

when the display device implements the large-screen display, the elevating mechanism is configured to drive the first bottom plate or/and the second bottom plate to move in a direction close to the flexible display screen, so that the first bottom plate or/and the second bottom plate contacts with the corresponding supporting plate; and when the display device implements the small-screen display, the elevating mechanism is configured to drive the first bottom plate or/and the second bottom plate to move in a direction far away from the flexible display screen, so that the first bottom plate is contained between the second bottom plate and the second supporting plate or the second bottom plate is contained between the first bottom plate and the first supporting plate.

In the display device of the present disclosure, the first supporting component and the second supporting component are comb-shaped structures which are in coordination with each other.

In the display device of the present disclosure, the case assembly further includes a processor, a driving chip, and a power assembly.

In the display device of the present disclosure, the case assembly further includes a motor driving device disposed therein, the motor driving device is configured to drive the transmission mechanism to work, so that the display device implements the switching of the large-screen display and the small-screen display.

In the present disclosure, the transmission mechanism is disposed in the display device, so that the first supporting component slides relative to the second supporting component and the two ends of the flexible display screen move with the same distance in the same time. As such, a pull tension applied to the display device is not large when the display device is stretched or folded. Damage of the flexible display screen can be avoided, and the usage life of the display device can be extended. Furthermore, the display device can implement a large-screen display or a small-screen display without increasing a size thereof.

DETAILED DESCRIPTION OF EMBODIMENTS

To make the objectives, technical schemes, and technical effects of the present disclosure more clearly and definitely, the present disclosure will be described in details below by using embodiments in conjunction with the appending drawings. It should be understood that the specific embodiments described herein are merely for explaining the present disclosure but not intended to limit the present disclosure.

Compared to the traditional screens, the flexible screens have characteristics of strong flexibility and being bendable and can decrease degrees of destroying devices accidentally. Durability of the flexible screens is greater than durability of other screens. Although sizes of the conventional display panels are decreased to a certain extent, the conventional display panels still occupy great space.

Please refer to FIG. 1 to FIG. 8. The present disclosure provides a display device 100 including:
- a case assembly 10, a first supporting component 13 disposed to be fixed to the case assembly 10, a second supporting component 14 disposed to be slidable relative to the first supporting component 13, and a transmission mechanism disposed in the case assembly 10 and connected to the second supporting component 14; and
- a flexible display screen 20 laying on one side of the first supporting component 13 and one side of the second supporting component 14, a first end of the flexible display screen 20 connected to one end of the second supporting component 14 far away from the first supporting component 13, and a second end of the flexible display screen 20 connected to the transmission mechanism;
- wherein when the first supporting component 13 slides relative to the second supporting component 14, the two ends of the flexible display screen 20 move, due to effect of the transmission mechanism, with the same distance in the same time.

In the present disclosure, the transmission mechanism is disposed in the display device 100, so that the first supporting component 13 slides relative to the second supporting component 14 and the two ends of the flexible display screen 20 move with the same distance in the same time. As such, the display device 100 can implement a large-screen display or a small-screen display without increasing a size thereof.

Technical schemes of the present disclosure are described as follows in conjunction with embodiments.

Please refer to FIG. 1 to FIG. 8. The case assembly 10 may include a first case body 11 and a second case body 12 which are disposed opposite to each other. The first case body 11 is fixed to and connected to the first supporting component 13. The second case body 12 is fixed to and connected to the second supporting component 14. The flexible display screen 20 may include a first part 21 disposed on a surface of the case assembly 10 and a second part 22 disposed in the case assembly 10. The transmission mechanism may include at least gear set 32 and at least one screw 40 which are positioned on the first case body 11 and a rack set 31 which is positioned on the second case body 12. The gear set 32 engages with the rack set 31. The screw 40 and the gear set 32 rotate coaxially.

When the display device 100 implements the small-screen display, the first part 21 of the flexible display screen 20 is in a display state and the second part 22 of the flexible display screen 20 is in a non-display state. When the display device 100 implements the large-screen display, the rack set 31 on the second case body 12 drives, via the gear set 32, the screw 40 to rotate, so that the second case body 12 moves in a direction far away from the first case body 11, the second part 22 of the flexible display screen 20 moves from inside of the case assembly 10 to the surface of the case assembly 10, and the first part 21 and the second part of the flexible display screen 20 are in the display state.

In the present disclosure, the gear set 32, the rack set 31, and the screw 40 are disposed in the display device, and the rack set 31 and the gear set 32 drive the screw 40 to rotate, so that the second case body 12 moves in a direction far away from or close to the first case body 11. As such, the display device 100 can implement the large-screen display or the small-screen display without increasing the size thereof.

Figure 1:
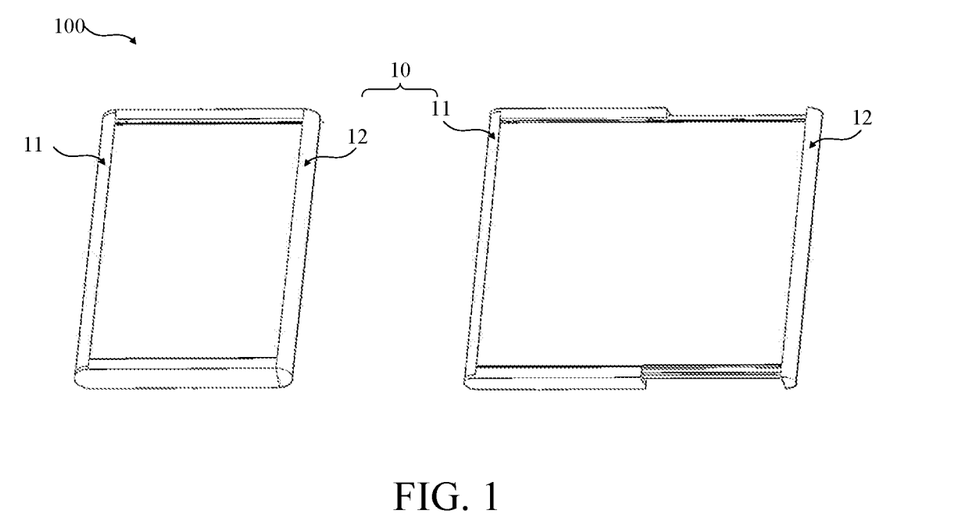
FIG. 1 illustrates a structural diagram of a display device of the present disclosure.

Please refer to FIG. 1. A structural diagram of the display device 100 in a closed state is illustrated in a left side of FIG. 1. A structural diagram of the display device 100 in an opened state is illustrated in a right side of FIG. 1. A user provides driving force in a first direction for the second case body 12, so that the second case body 12 moves in the direction far away from the first case body 11 and the display device 100 is in the opened state. Similarly, the user may provide driving force in a direction opposite to the first direction for the second case body 12, so that the second case body 12 moves in the direction close to the first case body 11 and the display device 100 is in the closed state.

In the present embodiment, the first direction is a direction of opening the second case body 12.

Figure 2:
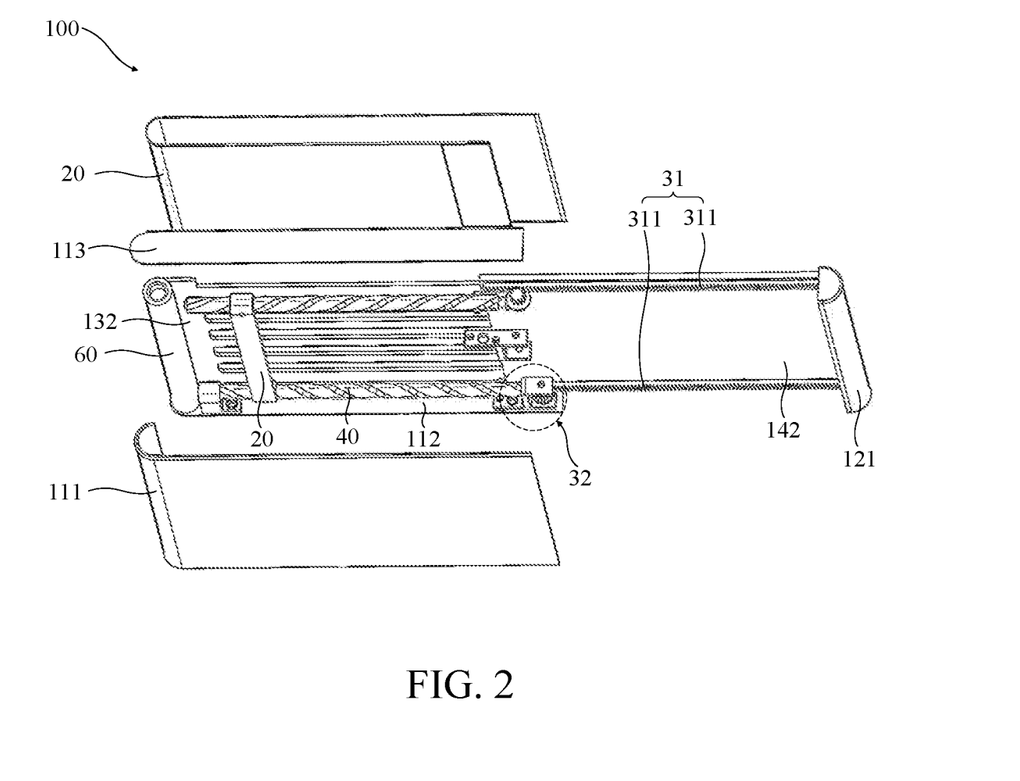
FIG. 2 illustrates an exploded diagram of the display device of the present disclosure.

Please refer to FIG. 2. The first case body 11 includes a rear case 111 and a first side case 112 and a second side case 113 which are positioned at two sides of the rear case 111. The second case body 12 includes a front case 121. The first supporting component 13 is fixed to and connected to the rear case 111, the first side case 112, and the second side case 113. The first side case 112 corresponds to a first side surface of the first case body 11. The second side case 113 corresponds to a second side surface of the first case body 11. The second supporting component 14 is fixed to and connected to the front case 121. The second supporting component 14 is positioned between the first side case 112 and the second side case 113.

When the display device 100 implements the large-screen display, an external driving force drives the front case 121 to move in the first direction, so that the display device 100 is in the opened state.

In the display device 100 of the present disclosure, the rack set 31 includes at least one first rack 311. The first rack 311 is disposed close to a first side surface or/and a second side surface of the second case body 12.

Please refer to FIG. 2. The rack set 31 may include two first racks 311 which are symmetrically disposed with respect to a center line of the second supporting component 14. One of the two first racks 311 is disposed close to a first side of the second supporting component 14, and the other of the two first racks 311 is disposed close to a second side of the second supporting component 14. The first side of the second supporting component 14 corresponds to the first side surface of the second case body 12. The second side of the second supporting component 14 corresponds to the second side surface of the second case body 12.

In the present embodiment, the first racks 311 bond to one side of the second supporting component 14 far away from the flexible display screen 20 and fixed to and connected to the second supporting component 14.

Figure 3:
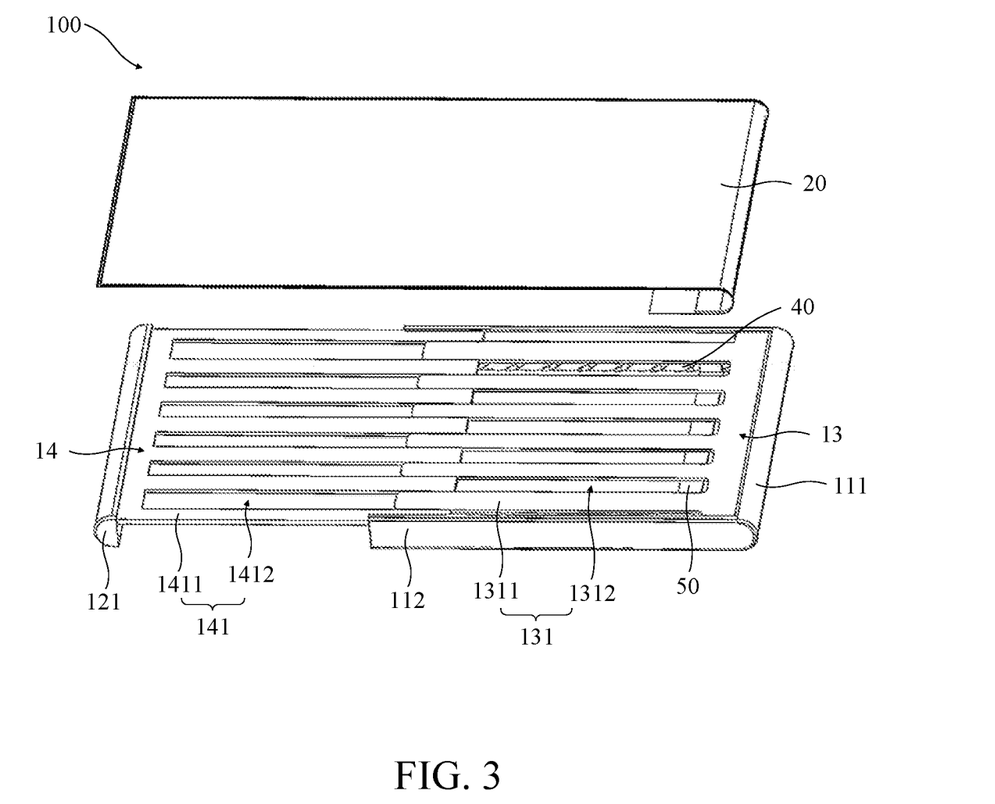
FIG. 3 illustrates a structural diagram of the display device of the present disclosure in an opened state.
Figure 4:
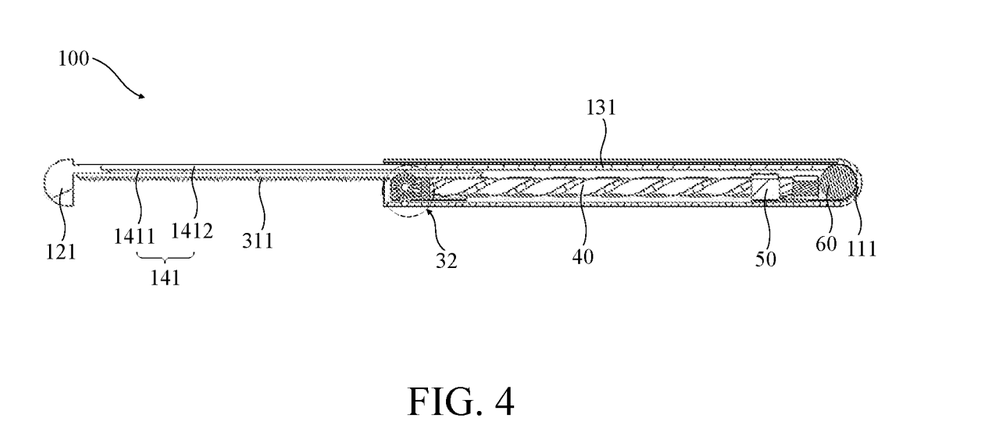
FIG. 4 illustrates a cross-section diagram of the display device of the present disclosure in the opened state.

Please refer to FIG. 3 and FIG. 4. When the display device 100 implements the large-screen display, the first racks 311 drive, via the gear set 32, the screw 40 to rotate, so that the second case body 12 moves in the direction far away from the first case body 11.

Furthermore, a number of the first racks 311 and a number of the gear set 32 are not limited to two. For example, plural first racks 311 and the corresponding gear sets 32 may be disposed in equal distances between the first side and the second side of the second supporting component 14.

In the display device 100 of the present disclosure, the gear set 32 at least includes:
- at least one first gear 321, the first gear 321 engaging with the first rack 311, and the first gear 321 positioned at one side of the first rack 311 far away from the flexible display screen 20;
- at least one second gear 322, and the first gear 321 and the second gear 322 rotating coaxially;
- at least one first roller, and the first roller penetrating the first gear 321 and the second gear 322 and fixed to and connected to the first gear 321 and the second gear 322; and
- at least one third gear 323, the third gear 323 engaging with the second gear 322, and the third gear 323 and the screw 40 rotating coaxially.

Figure 5:
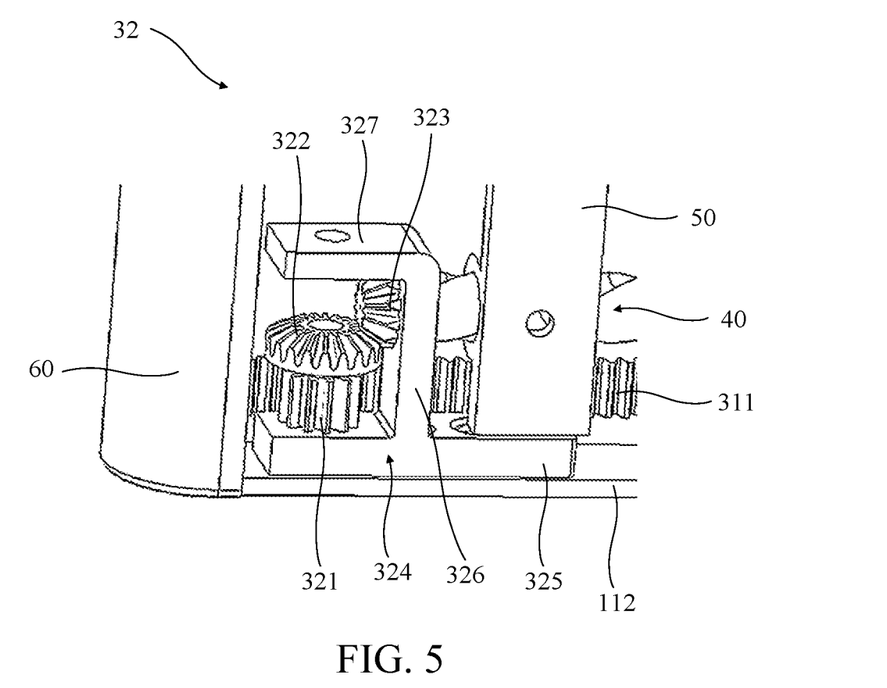
FIG. 5 illustrates an enlarged diagram of a gear set of the display device of the present disclosure.

Please refer to FIG. 5. The gear set 32 may include the first gear 321, the second gear 322, the first roller, and the third gear 323. The first gear 321 engages with the first rack 311. The first gear 321 and the second gear 322 rotate coaxially via the first roller. The third gear 323 engages with the second gear 322. The third gear 323 and the screw 40 rotate coaxially.

In the present embodiment, the first gear 321 may be a spur gear. The second gear 322 and the third gear 323 may be bevel gears.

In the present embodiment, when the display device 100 implements the large-screen display, the first racks 311 transmit, via the first gear 321, the second gear 322, the third gear 323, and the first roller, the driving force to the screw 40, so that the second case body 12 moves via the screw 40 in the direction far away from the first case body 11.

In the display device 100 of the present disclosure, the gear set 32 may further includes:
- at least two first bearing sets, each of the first bearing sets including two first bearings, the first bearings positioned at two sides of the first roller, the first bearings fixed to and connected to the first roller, and the first gear 321, the second gear 322, and the first roller rotating in the first bearings; and
- at least two gear stands 324, each of the gear stands 324 corresponding to one of the first bearing sets, the gear stands 324 fixed to and connected to the first side case 112 or/and the second side case 113 of the first case body 11, and the first case body 11 and the second case body 12 make the gear stands 324 have a first opening toward the front case 121 of the second case body 12.

Please refer to FIG. 5. A number of the first bearing sets and a number of the gear stands 324 correspond to a number of the first gears 321. The gear stands 324 are configured to fix the first gears 321 and the second gears 322 via the first bearing sets.

In the present embodiment, each of the gear stands 324 includes a first plate 325, a second plate 326, and a third plate 327. The first plate 325 is fixed to and connected to the first side case 112 or the second side case 113 of the first case body 11. The second plate 326 is positioned between the first plate 325 and the third plate 327. The third gear 323 engages with the second gear 322 via a hole of the second plate 326. The first bearings may be positioned on the first plate 325 and the third plate 327.

In the present embodiment, a structure surrounded by the rear case 111 of the first case body 11, the second supporting component 14 of the second case body 12, the first plate 325, the second plate 326, and the third plate 327 make the gear stands 324 have the first opening toward the front case 121 of the second case body 12.

In the present embodiment, the first bearings may be ball bearings or plain bearings, but the present disclosure is not limited thereto. The first roller is fixed to and connected to inner bearings of the first bearings. Outside bearings of the first bearings are fixed to and connected to the first side case 112 of the first case body 11, the second side case 113 of the first case body 11, or the first plate 325. The first roller and the inner bearings of the first bearings rotate in the outside bearings of the first bearings under effect of the external driving force.

In the display device 100 of the present disclosure, the display device 100 may further includes:
- a sliding block 50, and the sliding block 50 slidably connected to the screw 40; and
- a second roller 60 positioned at one side of the first case body 11 far away from the gear set 32, and the second part 22 of the flexible display screen 20 extending to inside of the first case body 11 along the second roller 60 and fixed to and connected to the sliding block 50.

Please refer to FIG. 2. A first terminal of the flexible display screen 20 is fixed to the front case 121 of the second case body 12, and a second terminal of the flexible display screen 20 is fixed to the sliding block 50. When the second case body 12 moves in the first direction, the sliding block 50 correspondingly moves following the screw 40.

In the present embodiment, the sliding block 50 includes a protruding structure (e.g., a ball) corresponding to a screw thread of the screw 40. When the screw 40 rotates, the sliding block 50 may move on the screw via the protruding structure in a back and forth manner.

In the present embodiment, the flexible display screen 20 extends from outside of the first case body 11 to inside of the first case body 11 via the second roller 60. The flexible display screen 20 is rotated 180 degrees via the second roller 60 and extends to the first roller, so that one terminal of the flexible display screen 20 is fixed to and connected to the sliding block 50.

Please refer to FIG. 3 and FIG. 4. When the display device 100 implements the large-screen display, the external driving force drives the second case body 12 to move in the direction far away from the first case body 11. The first rack 311 drives the first roller to rotate via the first gear 321. Since the second gear 322 and the first gear 321 and the second gear 322 rotate coaxially via the first roller, the second gear 322 engages with the third gear 323, and the third gear 323 and the screw 40 rotate coaxially, the first rack 311 transmits the force to the screw 40. Since the screw 40 is slidably connected to the sliding block 50, the screw 40 rotates to drive the sliding block 50 to move in a direction far away from the first gear 321, so that the second part 22 of the flexible display screen 20 moves from the inside of the first case body 11 to a surface of the first case body 11.

Figure 6:
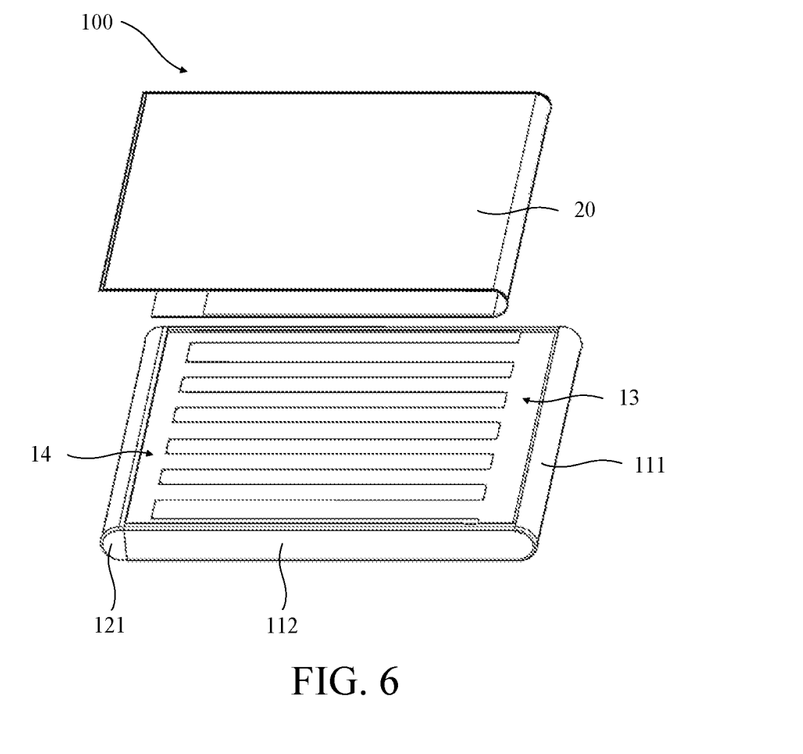
FIG. 6 illustrates a structural diagram of the display device of the present disclosure in a closed state.
Figure 7:
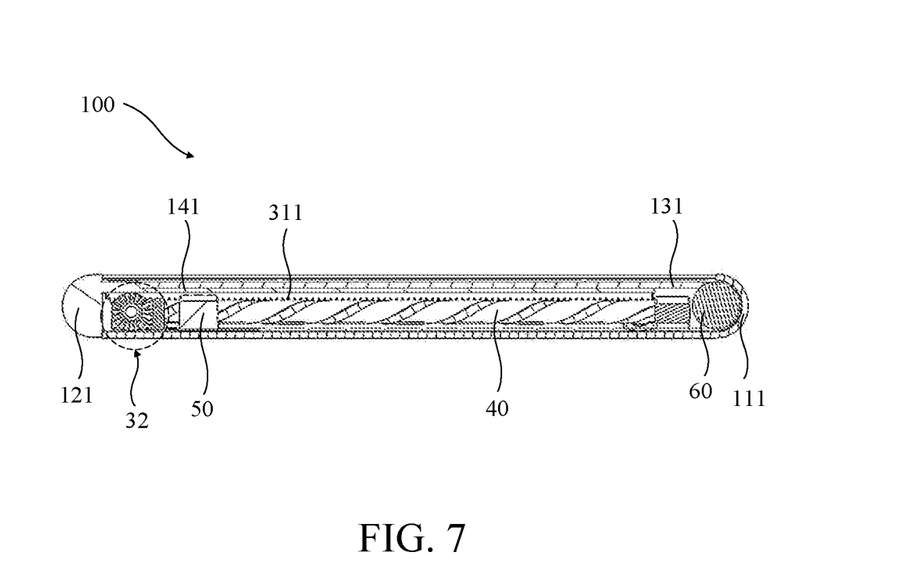
FIG. 7 illustrates a cross-section diagram of the display device of the present disclosure in the closed state.

Please refer to FIG. 6 and FIG. 7. When the display device 100 implements the small-screen display, the external driving force drives the second case body 12 to move in a direction close to the first case body 11. A moving direction of the gear set 32, the rack set 31, and the screw 40 is opposite to a moving direction in FIG. 3 and FIG. 4. The screw 40 drives the sliding blocks 50 to move in a direction close to the first gear 321, so that the second part 22 of the flexible display screen 20 moves from the surface of the first case body 11 to the inside of the first case body 11 and extends in a direction toward the first gear 321.

In the present embodiment, when a pitch diameter of the first gear 321 is A, a pitch diameter of the second gear 322 is B, a pitch diameter of the third gear 323 is C, and a screw pitch of the screw 40 is L, a relationship of the first gear 321, the second gear 322, the third gear 323, and the screw 40 is $B*L=\pi*A*C$.

For example, when a moving distance of the second case body 12 is X, a moving distance of the first rack 311 is X. Since the first gear 321 engages with the first rack 311, a rotating arc length of the first gear 321 is X. It can be understood that a rotating radian of the first gear 321 is $2X/A$. Second, since the first gear 321 and the second gear 322 rotate coaxially via the first roller, a rotating radian of the second gear 322 is equal to the rotating radian of the first gear 321. A corresponding rotating arc length of the second gear 322 is $(X*B)/A$. Furthermore, since the third gear 323 engages with the second gear 322, a rotating arc length of the third gear 323 is equal to the rotating arc length of the second gear 322. That is, a corresponding rotating arc length of the third gear 323 is $(X*B)/A$, and a rotating radian of the third gear 323 is $(2X*B)/(A*C)$. Finally, since the third gear 323 and the screw 40 rotate coaxially, a rotating radian of the screw 40 is equal to the rotating radian of the third gear 323. A corresponding rotating arc length of the second gear 322 is $(X*B)/A$. The screw pitch of the screw 40 is L. A moving distance of the sliding block fixed to and connected to the screw 40 is $(X*B*L)/(\pi*A*C)$ when the radian is $(2X*B)/(A*C)$. Since the relationship of the first gear 321, the second gear 322, the third gear 323 is C, and the screw 40 is $B*L=\pi*A*C$, a moving distance of the sliding block 50 fixed to and connected to the screw 40 is X which is equal to the moving distance of the second case body 12. As such, pull tension of a display panel 201 in the display device 100 can be minimum, and a usage span of the display device 100 can be increased.

Figure 8:
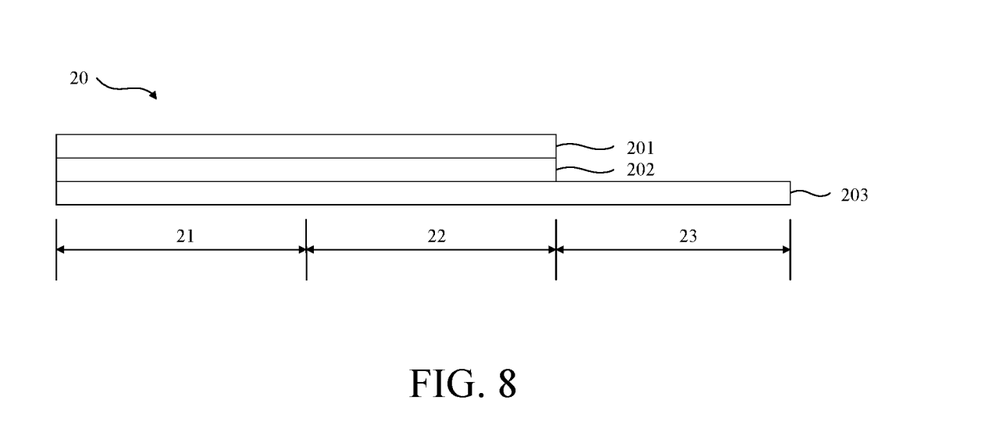
FIG. 8 illustrates an expanded diagram of a flexible display screen of a display panel of the present disclosure.

Please refer to FIG. 8. The flexible display screen 20 may include the display panel 201, a tensile layer 203, and an adhesive layer 202 positioned between the display panel 201 and the tensile layer 203. A first terminal of the tensile layer 203 is fixed to and connected to the second case body 12, and a second terminal of the tensile layer 203 is fixed to and connected to the sliding block 50.

In the present embodiment, the flexible display screen 20 further includes a third part 23 fixed to and connected to the sliding block 50. The third part 23 of the flexible display screen 20 is fixed to and connected to the sliding block 50. The third part 23 of the flexible display screen 20 is a non-functional area, that is, an invalid display area.

In the present embodiment, the display panel 201 may be an LCD display screen or an OLED display area. The display panel 201 may be bent to any one shape.

In the present embodiment, an area of the display panel 201 is smaller than an area of the tensile layer 203.

In the present embodiment, the adhesive layer 202 may be a viscous layer such as an optical adhesive.

In the present embodiment, a material of the tensile layer 203 may be a tensible material, for example, a sus metallic material or an amorphous material. When the material of the tensile layer 203 is a sus metallic material, a thickness of the tensile layer 203 may be ranged from 25 micrometers to 35 micrometers.

Please refer to FIG. 2 to FIG. 7. The first supporting component 13 may include a first supporting plate 131. The first supporting plate 131 may include a plurality of first supporting bars 1311 and a plurality of first insertion holes 1312 each positioned between two adjacent ones of the first supporting bars 1311. The second supporting component 14 may include a second supporting plate 141. The second supporting plate 141 may include a plurality of second supporting bars 1411 and a plurality of second insertion holes 1412 each positioned between two adjacent ones of the second supporting bars 1411.

In the present embodiment, the first supporting plate 131 and the second supporting component 141 may be, but is not limited to, comb-shaped structures.

Please refer to FIG. 6 and FIG. 7. When the display device 100 implements the small-screen display, the first insertion holes 1312 are configured to contain the second supporting bars 1411 and the second insertion holes 1412 are configured to contain the first supporting bars 1311, so that the first supporting plate 131 cooperates with the second supporting plate 141 to support the first part 21 of the flexible display screen 20.

Please refer to FIG. 3 and FIG. 4. When the display device 100 implements the large-screen display, the second supporting component 14 moves in the direction far away from the first case body 11. The second part of the flexible display screen 20 moves from the inside of the first case body 11 to the surface of the first case body 11. The second supporting plate 141 is separated from the first supporting plate 131. The second supporting component 14 is configured to support the first part 21 of the flexible display screen 20, and the first supporting component 13 is configured to support the second part 22 of the flexible display screen 20.

Please refer to FIG. 2 to FIG. 7. The first supporting component 13 further includes a first bottom plate 132 positioned at one side of the first supporting plate 131 far away from the flexible display screen 20. The second supporting component 14 further includes a second bottom plate 142 positioned at one side of the second supporting plate 141 far away from the flexible display screen 20.

A first gap is formed between the first bottom plate 132 and the first supporting plate 131. The first gap is configured to contain the second bottom plate 142. Alternatively, a second gap is formed between the second bottom plate 142 and the second supporting plate 141. The second gap is configured to contain the first bottom plate 132. The present disclosure is not limited thereto.

In the display device 100 of the present disclosure, the display device 100 further includes an elevating mechanism configured to adjust the first bottom plate 132 or/and the second bottom plate 142.

When the display device 100 implements the large-screen display, the elevating mechanism is configured to drive the first bottom plate 132 or/and the second bottom plate 142 to move in a direction close to the flexible display screen 20, so that the first bottom plate 132 or/and the second bottom plate 142 contacts with the corresponding supporting plate. When the display device 100 implements the small-screen display, the elevating mechanism is configured to drive the first bottom plate 132 or/and the second bottom plate 142 to move in a direction far away from the flexible display screen 20, so that the first bottom plate 132 is contained between the second bottom plate 142 and the second supporting plate 141 or the second bottom plate 142 is contained between the first bottom plate 132 and the first supporting plate 131.

In the display device 100 of the present disclosure, the case assembly 10 may further include a processor, a driving chip, a power assembly and so on. The present disclosure is not limited thereto.

In the display device 100 of the present disclosure, the case assembly 10 may further include a motor driving device disposed therein. The motor driving device is capable of controlling the transmission mechanism via electrical signals. Predetermined electrical signals are provided for the motor driving device via buttons or gesture operations on the screen to drive the transmission mechanism to work, so that the display device 100 implements the switching of the large-screen display and the small-screen display.

The present disclosure provides a display device including: a case assembly, a first supporting component disposed to be fixed to the case assembly, a second supporting component disposed to be slidable relative to the first supporting component, and a transmission mechanism disposed in the case assembly and connected to the second supporting component; and a flexible display screen laying on one side of the first supporting component and one side of the second supporting component, a first end of the flexible display screen connected to one end of the second supporting component far away from the first supporting component, and a second end of the flexible display screen connected to the transmission mechanism. In the present disclosure, the transmission mechanism is disposed in the display device, so that the first supporting component slides relative to the second supporting component and the two ends of the flexible display screen move with the same distance in the same time. As such, a pull tension applied to the display device is not large when the display device is stretched or folded. Damage of the flexible display screen can be avoided, and the usage life of the display device can be extended. Furthermore, the display device can implement a large-screen display or a small-screen display without increasing a size thereof.

It should be understood that the present disclosure is not limited to the exemplary examples. Those skilled in the art may achieve equivalent improvements or replacements according to the above description. The equivalent improvements and replacements should be considered to belong to the protection scope of the present disclosure.

What is claimed is:

1. A display device, comprising:
  a case assembly, a first supporting component disposed to be fixed to the case assembly, a second supporting component disposed to be slidable relative to the first supporting component, and a transmission mechanism disposed in the case assembly and connected to the second supporting component; and
  a flexible display screen laying on one side of the first supporting component and one side of the second supporting component, a first end of the flexible display screen connected to one end of the second supporting component far away from the first supporting component, and a second end of the flexible display screen connected to the transmission mechanism;
  wherein when the first supporting component slides relative to the second supporting component, the two ends of the flexible display screen move, due to effect of the transmission mechanism, with the same distance in the same time,
  wherein the case assembly comprises a first case body and a second case body which are disposed opposite to each other, the first case body is fixed to and connected to the first supporting component, and the second case body is fixed to and connected to the second supporting component;
  the flexible display screen comprises a first part disposed on a surface of the case assembly and a second part disposed in the case assembly;
  the transmission mechanism comprises at least gear set and at least one screw which are positioned on the first case body and a rack set which is positioned on the second case body, the gear set engages with the rack set, and the screw and the gear set rotate coaxially;
  when the display device implements a small-screen display, the first part of the flexible display screen is in a display state and the second part of the flexible display screen is in a non-display state; and
  when the display device implements a large-screen display, the rack set on the second case body drives, via the gear set, the screw to rotate, so that the second case body moves in a direction far away from the first case body, the second part of the flexible display screen moves from inside of the case assembly to the surface of the case assembly, and the first part and the second part of the flexible display screen are in the display state.

2. The display device of claim 1, wherein the rack set comprises at least one first rack, and the first rack is disposed close to a first side surface or/and a second side surface of the second case body; and
  when the display device implements the large-screen display, the first rack drives, via the gear set, the screw to rotate, so that the second case body moves in the direction far away from the first case body.

3. The display device of claim 2, wherein the gear set at least comprises:
  at least one first gear, the first gear engaging with the first rack, and the first gear positioned at one side of the first rack far away from the flexible display screen;
  at least one second gear, and the first gear and the second gear rotating coaxially;
  at least one first roller, and the first roller penetrating the first gear and the second gear and fixed to and connected to the first gear and the second gear; and
  at least one third gear, the third gear engaging with the second gear, and the third gear and the screw rotating coaxially;
  when the display device implements the large-screen display, the first rack transmits, via the first gear, the second gear, the third gear, and the first roller, a driving force to the screw, so that the second case body moves via the screw in the direction far away from the first case body.

4. The display device of claim 3, wherein the gear set further comprises:
   at least two first bearing sets, each of the first bearing sets comprising two first bearings, the first bearings positioned at two sides of the first roller, the first bearings fixed to and connected to the first roller, and the first gear, the second gear, and the first roller rotating in the first bearings; and
   at least two gear stands, each of the gear stands corresponding to one of the first bearing sets, the gear stands fixed to and connected to a first side case or/and a second side case of the first case body, and the first case body and the second case body make the gear stands have a first opening toward a front case of the second case body.

5. The display device of claim 3, wherein the first gear is a spur gear, and the second gear and the third gear are bevel gears; and
   wherein when a pitch diameter of the first gear is A, a pitch diameter of the second gear is B, a pitch diameter of the third gear is C, and a screw pitch of the screw is L, a relationship of the first gear, the second gear, the third gear, and the screw is $B*L=\pi*A*C$.

6. The display device of claim 3, wherein the display device further comprises:
   a sliding block, and the sliding block slidably connected to the screw; and
   a second roller positioned at one side of the first case body far away from the gear set, and the second part of the flexible display screen extending to inside of the first case body along the second roller and fixed to and connected to the sliding block;
   wherein when the display device implements the large-screen display, the external driving force drives the second case body to move in the direction far away from the first case body and the screw drives the sliding block to move in a direction far away from the first gear, so that the second part of the flexible display screen moves from the inside of the first case body to a surface of the first case body; and
   when the display device implements the small-screen display, the external driving force drives the second case body to move in a direction close to the first case body, the screw drives the sliding block to move in a direction close to the first gear, and the flexible display screen rolls along the second roller, so that the second part of the flexible display screen moves from the surface of the first case body to the inside of the first case body and extends toward a direction of the first roller.

7. The display device of claim 6, wherein the flexible display screen comprises a display panel, a tensile layer, and an adhesive layer positioned between the display panel and the tensile layer, a first terminal of the tensile layer is fixed to and connected to the second case body, and a second terminal of the tensile layer is fixed to and connected to the sliding block.

8. The display device of claim 7, wherein an area of the display panel is smaller than an area of the tensile layer.

9. The display device of claim 8, wherein the flexible display screen further comprises a third part fixed to and connected to the sliding block, the third part of the flexible display screen corresponds to the tensile layer, and the third part of the flexible display screen is a non-functional area of the display device.

10. The display device of claim 7, wherein a material of the tensile layer is a tensible material including a sus metallic material or an amorphous material.

11. The display device of claim 7, wherein the adhesive layer is a viscous layer including an optical adhesive.

12. The display device of claim 4, wherein the first case body comprises a rear case and a first side case and a second side case which are positioned at two sides of the rear case, the second case body comprises a front case, the first supporting component is fixed to and connected to the rear case, the first side case, and the second side case, and the second supporting component is fixed to and connected to the front case;
   the first supporting component comprises a first supporting plate, and the first supporting plate comprises a plurality of first supporting bars and a plurality of first insertion holes each positioned between two adjacent ones of the first supporting bars;
   the second supporting component comprises a second supporting plate, and the second supporting plate comprises a plurality of second supporting bars and a plurality of second insertion holes each positioned between two adjacent ones of the second supporting bars;
   when the display device implements the small-screen display, the first insertion holes are configured to contain the second supporting bars and the second insertion holes are configured to contain the first supporting bars, so that the first supporting plate cooperates with the second supporting plate to support the first part of the flexible display screen; and
   when the display device implements the large-screen display, the second supporting component moves in the direction far away from the first case body, the second part of the flexible display screen moves from inside of the first case body to a surface of the first case body, the second supporting plate is separated from the first supporting plate, the second supporting component is configured to support the first part of the flexible display screen, and the first supporting component is configured to support the second part of the flexible display screen.

13. The display device of claim 12, wherein the first supporting component further comprises a first bottom plate positioned at one side of the first supporting plate far away from the flexible display screen, and the second supporting component further comprises a second bottom plate positioned at one side of the second supporting plate far away from the flexible display screen; and
   a first gap is formed between the first bottom plate and the first supporting plate, and the first gap is configured to contain the second bottom plate; or a second gap is formed between the second bottom plate and the second supporting plate, and the second gap is configured to contain the first bottom plate.

14. The display device of claim 13, wherein the display device further comprises an elevating mechanism configured to adjust the first bottom plate or/and the second bottom plate;
   when the display device implements the large-screen display, the elevating mechanism is configured to drive the first bottom plate or/and the second bottom plate to move in a direction close to the flexible display screen, so that the first bottom plate or/and the second bottom plate contacts with the corresponding supporting plate; and when the display device implements the small-screen display, the elevating mechanism is configured to drive the first bottom plate or/and the second bottom plate to move in a direction far away from the flexible display screen, so that the first bottom plate is contained between the second bottom plate and the second supporting plate or the second bottom plate is contained between the first bottom plate and the first supporting plate.

15. The display device of claim 12, wherein the first supporting component and the second supporting component are comb-shaped structures which are in coordination with each other.

16. The display device of claim 1, wherein the case assembly further comprises a processor, a driving chip, and a power assembly.

17. The display device of claim 1, wherein the case assembly further comprises a motor driving device disposed therein, the motor driving device is configured to drive the transmission mechanism to work, so that the display device implements the switching of the large-screen display and the small-screen display.

\* \* \* \* \*